(12) United States Patent
Lu

(10) Patent No.: US 8,180,965 B2
(45) Date of Patent: May 15, 2012

(54) SYSTEM AND METHOD FOR CACHE ACCESS PREDICTION

(75) Inventor: Yen-Ju Lu, Taipei (TW)

(73) Assignee: Realtek Semiconductor Corp., Hsinchu (TW)

(*) Notice: Subject to any disclaimer, the term of this patent is extended or adjusted under 35 U.S.C. 154(b) by 690 days.

(21) Appl. No.: 12/244,772

(22) Filed: Oct. 3, 2008

(65) Prior Publication Data
US 2009/0094435 A1     Apr. 9, 2009

(30) Foreign Application Priority Data
Oct. 4, 2007  (TW) ................. 96137341 A

(51) Int. Cl.
*G06F 13/00* (2006.01)
(52) U.S. Cl. .................. 711/128; 711/E12.06
(58) Field of Classification Search .......... None
See application file for complete search history.

(56) References Cited

U.S. PATENT DOCUMENTS

| | | | |
|---|---|---|---|
| 5,168,463 A * | 12/1992 | Ikeda et al. ............. | 365/78 |
| 6,247,094 B1 * | 6/2001 | Kumar et al. ............ | 711/3 |
| 7,136,960 B2 | 11/2006 | Honig | |
| 7,774,573 B2 * | 8/2010 | Sawitzki et al. ......... | 711/202 |
| 2002/0133672 A1 * | 9/2002 | Van De Waerdt et al. .... | 711/128 |
| 2007/0157028 A1 | 7/2007 | Lott | |
| 2008/0162869 A1 * | 7/2008 | Kim et al. ............. | 711/216 |

FOREIGN PATENT DOCUMENTS

| | | |
|---|---|---|
| CN | 1564989 A | 1/2005 |
| WO | WO 0147168 A2 | 6/2001 |

* cited by examiner

*Primary Examiner* — Edward Dudek, Jr.
*Assistant Examiner* — Sean D Rossiter
(74) *Attorney, Agent, or Firm* — Thomas, Kayden, Horstemeyer & Risley, LLP

(57) ABSTRACT

A cache system includes a cache having a plurality of cache units, a prediction table and a hashing module. The prediction table is utilized to store way information of at least one cache unit corresponding to at least one accessing address, and the hashing module generates a hashing value corresponding to a target accessing address and reads way information from the prediction table or writes the way information to the prediction table by using the hashing value as an index.

17 Claims, 3 Drawing Sheets

SYSTEM AND METHOD FOR CACHE ACCESS PREDICTION

BACKGROUND OF THE INVENTION

1. Field of the Invention

The present invention relates to a cache system, and more particularly, to a cache system capable of predicting how a cache is to be accessed according to an address.

2. Description of the Prior Art

U.S. Pat. No. 6,643,739 discloses a conventional cache system 100 as shown in FIG. 1. The conventional cache system 100 includes an address 110 having a tag field 111, an index field 112 and a word field 113, a cache 120, a plurality of comparators 130*a*-130*n*, a plurality of buffers 140*a*-140*n*, and a way prediction table 150. The operation principles for the above elements can be found by referring to U.S. Pat. No. 6,643,739. The conventional cache system 100, however, has some drawbacks; for example, addresses that have the same tag fields 111 all correspond to the same index in the way prediction table 150 since the way prediction table 150 utilizes the tag fields 111 of the addresses as the index in this cache system. Therefore, the predicted way of an accessing address A obtained from looking up the way prediction table 150 may be the previous hit way information of another accessing address B. Moreover, in order to accelerate the execution of computation, when receiving a current command from a processor, conventional cache systems access data in advance that is possibly requested by a next command according to the current command's address. Therefore, the way information stored in the way prediction table 150 is the way of the cache accessed by the next command, and is indexed by the tag field of the current command address. In this situation, if a command C received from the processor has more than two possible executing results, i.e., the address of the command C corresponds to a plurality of next commands C' and C'' (for example, the command C is a branch instruction, and the executing results include branch taken and branch not taken), the way information corresponding to the commands C' and C'' cannot be distinguished in the way prediction table 150 of the conventional cache system 100. As a result, the predicting accuracy of the conventional cache system 100 cannot be improved, causing insufficient power consumption of the cache system 100.

SUMMARY OF THE INVENTION

One objective of the present invention is therefore to provide a cache system capable of predicting cache access, and a predicting method thereof, to solve the problems of the prior arts, raise the prediction accuracy and reduce the power consumption of the cache system.

According to one exemplary embodiment of the present invention, a cache system is disclosed. The cache system comprises a cache comprising a plurality of cache units, a prediction table coupled to the cache, for storing way information of at least one cache unit correspondingly accessed by at least one address, and a hashing module coupled to the prediction table, for generating at least one hash value corresponding to a target address according to the target address, and utilizing the hash value as an index to write the way information to the prediction table or read the way information from the prediction table.

According to another exemplary embodiment of the present invention, a method of predicting a way of a cache to be accessed is disclosed. The cache comprises a plurality of cache units, and the method comprises storing way information of at least one cache unit in a prediction table, generating a hash value corresponding to a target address according to the target address, and utilizing the hash value as an index to retrieve a target way information from the prediction table or write the target way information to the prediction table, wherein the target way information corresponds to the target address.

These and other objectives of the present invention will no doubt become obvious to those of ordinary skill in the art after reading the following detailed description of the preferred embodiment that is illustrated in the various figures and drawings.

DETAILED DESCRIPTION

In order to avoid collisions such as when an index corresponds to a plurality of different accessing addresses during cache prediction, the present invention generates at least one hash value corresponding to at least one accessing address according to the accessing address, and accesses way information of a cache to/from a prediction table by utilizing the hash value as an index.

Figure 1:
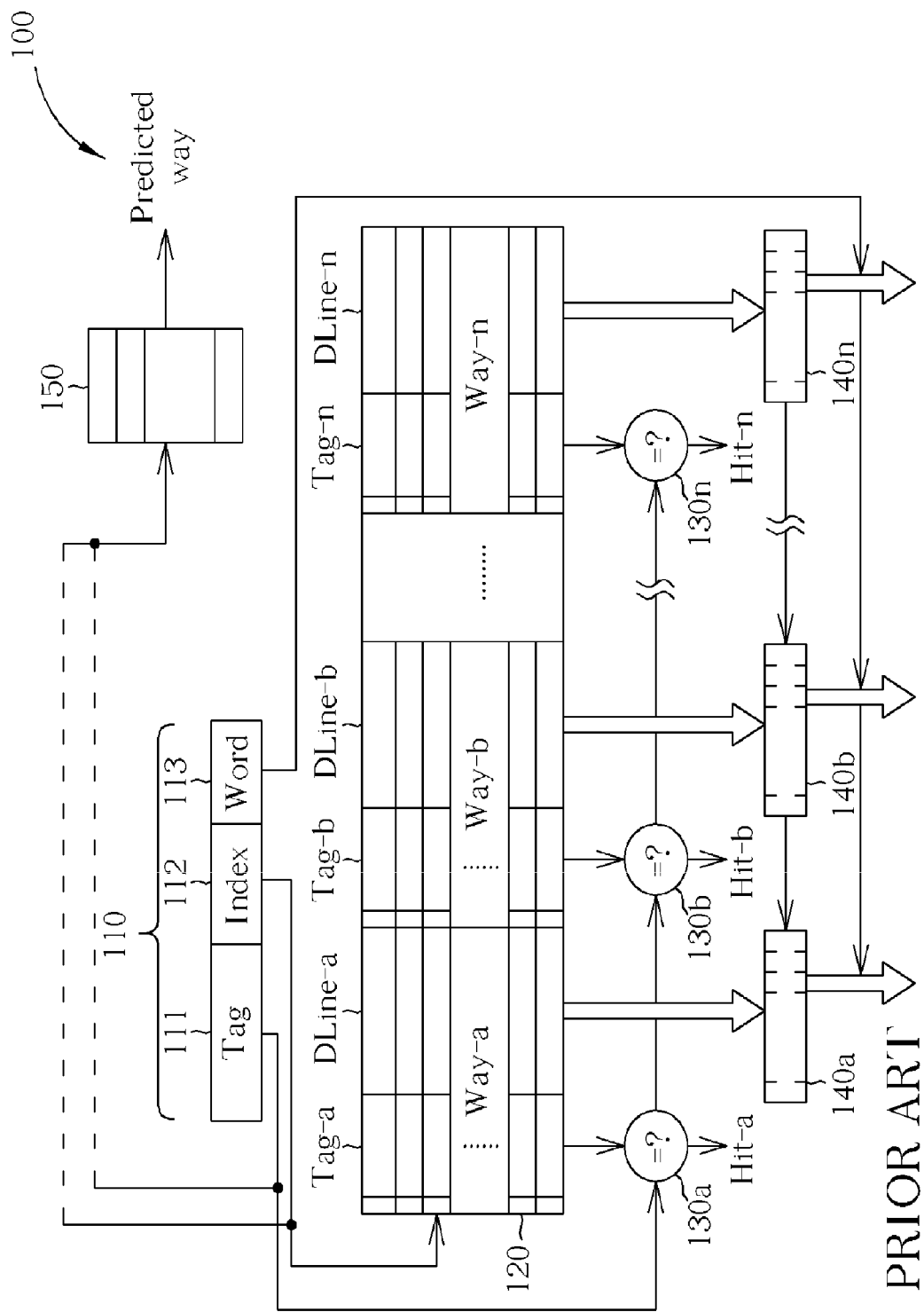
FIG. 1 is a diagram of a conventional cache system.
Figure 2:
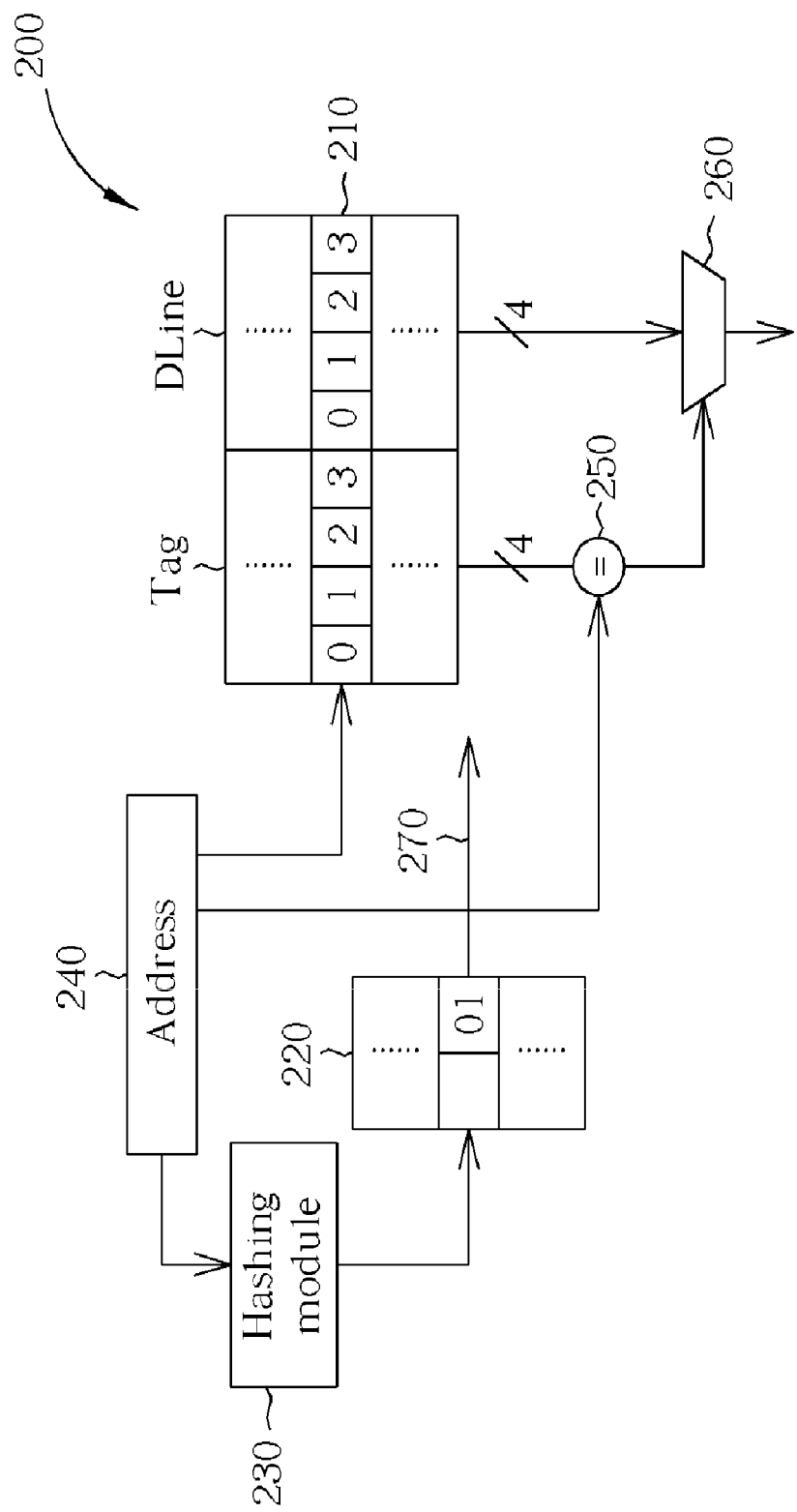
FIG. 2 is a diagram of a cache system according to one exemplary embodiment of the present invention.

FIG. 2 shows a diagram of a cache system 200 according to an embodiment of the present invention. The cache system 200 includes a cache 210, a prediction table 220, a hashing module 230, an address 240, a comparing circuit 250 and an output circuit 260. In one embodiment, the cache 210 is a set associative cache comprising a plurality of memory sets (the memory set may comprise 2 way cache units, 3 way cache units, . . . , or n way cache units). Each cache unit can be implemented by an SRAM. When the cache system 200 receives an address 240, the hashing module 230 performs a hashing computation on part of the address 240 (for example, the tag field of the address) to generate a hash value, and utilizes the hash value that corresponds to the address 240 as an index to access the prediction table 220, e.g. to write way information to the prediction table 220 or read way information from the prediction table 220. An enabling signal 270 is then generated according to the way information stored in the prediction table 220 indicated by the index, i.e., the hash value. The enabling signal 270 enables a specific way indicated by the way information of the cache 210, and the comparing circuit 250 corresponding to the specific way determines whether the specific way stores the data requested by the address 240. If the comparing circuit 250 determines that the specific way has stored the requested data, the cache 210 outputs the data stored in the specific way; otherwise, other ways (there are 3 other ways in FIG. 2) are enabled and their tags are compared with the tag of the address 240. If the comparing results of the ways are all mismatched, a cache miss happens; accessing other memories is necessary for obtaining the data requested by the address 240. In another embodiment, every way of the cache 210 is enabled, and the enabling signal 270 controls the output circuit 260 (i.e., a multiplexer, selector or a buffer) of the cache 210 to only output data stored in the specific way indicated by the way information.

Please note that when the prediction table 220 is established, part of the addresses, such as the tag fields of the addresses, are also performed with the hashing computation in order to generate a hash value as an index to store way information of the cache units in the prediction table 220. In one embodiment, the prediction table 220 is stored in a multi-port memory, and the prediction table 220 can be read and written simultaneously. In another embodiment, the prediction table 220 is stored in a single-port memory; the prediction table 220 is refreshed whenever there is a cache miss and the requested data is retrieved from another storage device to the cache 210. The replacement policy of the prediction table 220 can be the least recently used (LRU) algorithm or the most recently used (MRU) algorithm. Since the algorithms are familiar to those skilled in the art, detailed description is omitted herein. The algorithm used to refresh the prediction table 220 is not limited in the present invention.

Figure 3:
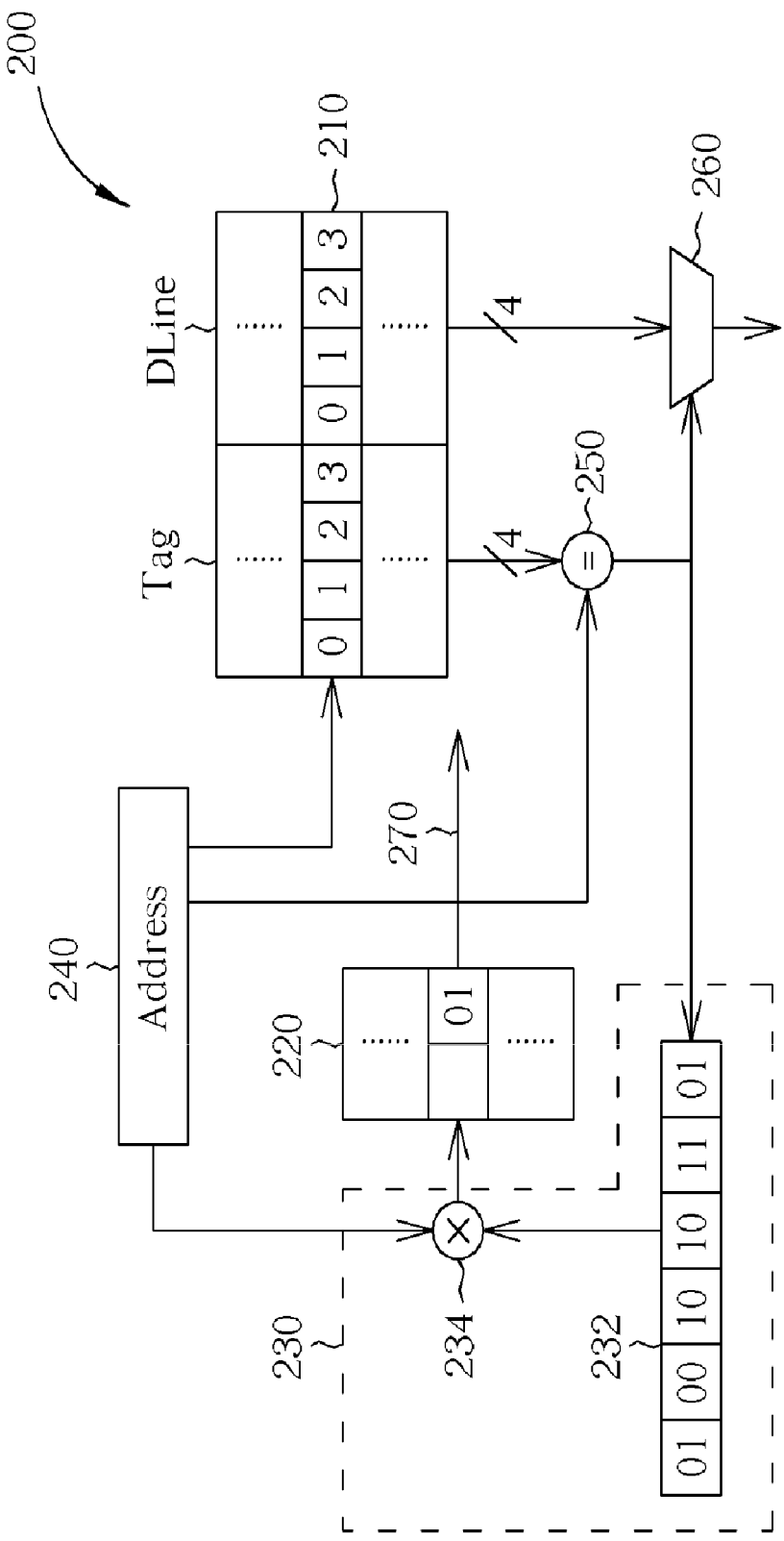
FIG. 3 is a diagram of a cache system according to another exemplary embodiment of the present invention.

Please refer to FIG. 3, which shows an embodiment of the cache system 200 of FIG. 2. In this embodiment, the hashing module 230 generates the hash value utilized as an index according to the access history of the cache 210 and the address 240. Therefore, the hashing module 230 comprises a cache access history register 232, for storing an access history of the cache 210, and a hashing computing unit 234 coupled to the cache access history register 232 and the prediction table 220, for generating the hash value according to the address 240 and the access history.

In one embodiment, the cache access history register 232 is implemented by a shift register. The length of the shift register is preferred to be the same as the length of the partial address (such as the tag field) that is utilized as the index. The length of the partial address that is utilized as the index is not limited by the above embodiments; the partial address can be part of the tag field of the address, or the tag field plus at least one bit in other embodiments. The length of the partial address, however, depends on the set number of the prediction table 220. For example, if the prediction table 220 has 64 sets, the length of the target field must exceed 6 bits to sufficiently represent each set; in this situation, the cache access history register 232 can be, but is not limited to, a 6-bit shift register. Moreover, the "00" shown in FIG. 3 represents the 0 way of the cache, "01" represents the first way of the cache, and so on.

The hashing computing unit 234 can be, but is not limited to, a logical XOR operation unit. In general, program codes have regular structures (e.g., locality), so it is expected that the access hit history (for cache) of a command currently executed will be the same as the access hit history formed at a last time the command is executed. Even if the access hit history is different from the access hit history formed at a last time the command is executed, a new index corresponding to the current access hit history can be established in the prediction table 220. Therefore, even if two addresses have the same tag fields, the hashing module 230 can generate two distinguishing indexes for accessing the prediction table 220 since the access hit histories of the two addresses have a high possibility of being different. The collisions are thereby avoided or reduced. The present embodiment can also reduce the collision of the command (for example, the branch instruction) that may have more than two execution results. The way information corresponding to each next command address can be respectively recorded in the prediction table 220 without erroneously refreshing the way information corresponding to other next command addresses. The prediction accuracy is therefore improved.

The present invention is not limited to be applied to the set associative cache. By utilizing a logical operation unit and a shift register to process the addresses, the above embodiments can obtain more than 90% prediction accuracy with low production cost, raising the access efficiency of the cache system and saving the power consumption.

Those skilled in the art will readily observe that numerous modifications and alterations of the device and method may be made while retaining the teachings of the invention.

What is claimed is:

1. A cache system, comprising:
    a cache, comprising a plurality of cache units;
    a prediction table, coupled to the cache, for storing way information of at least one cache unit correspondingly accessed by at least one accessing address; and
    a hashing module, coupled to the prediction table, for generating at least one hash value corresponding to a target accessing address according to the target accessing address, and utilizing the hash value as an index to write the way information to the prediction table or read the way information from the prediction table, wherein the hashing module comprises:
        a register, coupled to the cache, for storing an access history formed during accessing the cache; and
        a hashing computing unit, coupled to the register and the prediction table, for generating the hash value according to the access history and the target accessing address.

2. The cache system of claim 1, wherein the prediction table utilizes the hash value as an index to indicate the way information of the cache unit stored therein.

3. The cache system of claim 1, wherein the access history is an access hit history for cache.

4. The cache system of claim 3, wherein the access hit history comprises way information of at least one cache unit being read when at least one access hit happens.

5. The cache system of claim 3, wherein the register is a shift register, for sequentially recording way information of a cache unit being read each time an access hit happens.

6. The cache system of claim 1, wherein the hashing computing unit is a logical XOR operation unit.

7. The cache system of claim 1, wherein a size of the register corresponds to a length of a partial address that depends on a set number of the prediction table.

8. A method of predicting a way to be accessed of a cache, the cache comprising a plurality of cache units, the method comprising:
    storing way information of at least one cache unit in a prediction table;
    generating at least one hash value corresponding to a target accessing address according to the target accessing address, wherein generating the at least one hash value comprises:
        storing an access history formed during accessing the cache; and
        generating the hash value according to the target accessing address and the access history; and
    utilizing the hash value as an index to obtain a target way information from the prediction table or write the target way information to the prediction table, wherein the target way information corresponds to the target accessing unit.

9. The method of claim 8, wherein the step of storing the way information comprises:
    storing way information of the cache unit being accessed when a cache hit happens.

10. The method of claim 9, wherein the step of storing the way information comprises:
    storing way information of a cache unit of the cache where data retrieved from another storage device is stored when a cache miss happens.

11. The method of claim 8, wherein the hash value is utilized as an index to indicate the way information of the cache unit accessed correspondingly by the target accessing address during storage of the prediction table.

12. The method of claim 8, wherein the access history is an access hit history.

13. The method of claim 12, wherein the access history comprises way information of at least one cache unit being accessed when at least one cache hit happens.

14. The method of claim 12, wherein the step of storing the access history comprises:
when an access hit happens, utilizing a first-in-first-out (FIFO) replacing policy to replace one data in the access hit history, and forming a queue according to a storing order of the way information.

15. The method of claim 8, wherein the step of generating the hash value according to the target accessing address and the access history comprises: performing a logical XOR operation on the target accessing address and the access history to generate the hash value.

16. A method of predicting a way to be accessed of a cache, the cache comprising a plurality of cache units, the method comprising:
storing way information for the cache units in a prediction table;
generating a hash value based on a tag field of a target accessing address and an access history corresponding to the cache; and
utilizing the hash value as an index to read target way information from the prediction table or write target way information to the prediction table, wherein the target way information corresponds to a target accessing unit, wherein the prediction table is updated.

17. The method of claim 16, wherein the prediction table is implemented in a multi-port memory, wherein the prediction table supports simultaneous read requests and write requests.

* * * * *